United States Patent
Sommerfeld et al.

(10) Patent No.: US 6,631,337 B2
(45) Date of Patent: Oct. 7, 2003

(54) MODULATION ERROR COMPENSATION FOR A ROTATING LOAD CELL

(75) Inventors: Jodi L. Sommerfeld, Bloomington, MN (US); David M. Fricke, Prior Lake, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 254 days.

(21) Appl. No.: 09/842,505

(22) Filed: Apr. 26, 2001

(65) Prior Publication Data

US 2001/0054322 A1 Dec. 27, 2001

Related U.S. Application Data

(60) Provisional application No. 60/200,152, filed on Apr. 26, 2000.

(51) Int. Cl.[7] .............................................. G06F 19/00
(52) U.S. Cl. ........................ 702/106; 702/174; 702/43; 73/1.15; 73/781
(58) Field of Search ............................ 702/42, 43, 101, 702/104, 106, 173, 174, 175; 73/1.15, 781

(56) References Cited

U.S. PATENT DOCUMENTS

| | | | | |
|---|---|---|---|---|
| 4,763,531 A | | 8/1988 | Dietrich et al. .......... 73/862.04 |
| 5,492,002 A | * | 2/1996 | Higgins et al. .............. 73/1.14 |
| 5,540,108 A | * | 7/1996 | Cook et al. ............ 73/862.041 |
| 5,675,094 A | * | 10/1997 | Klauber et al. ........ 73/862.191 |
| 5,817,951 A | * | 10/1998 | Cook et al. ............ 73/862.041 |
| 5,952,587 A | * | 9/1999 | Rhodes et al. ......... 73/862.541 |
| 5,969,268 A | * | 10/1999 | Sommerfeld et al. .. 73/862.041 |
| 6,035,709 A | * | 3/2000 | Barnette, Jr. ................. 73/146 |
| 2002/0092360 A1 | * | 7/2002 | McDearmon ................ 73/795 |

\* cited by examiner

*Primary Examiner*—Patrick Assouad
(74) *Attorney, Agent, or Firm*—Westman, Champlin & Kelly, P.A.; S. Koehler

(57) ABSTRACT

A process for removing a modulation sinusoidal error from signals of a rotating load cell measuring forces and/or moments with respect to a non-rotating orthogonal coordinate system includes mounting the load cell to the rotating object and obtaining a first set of signals from the load cell, wherein at least one signal of the first set of signals is indicative of a load as the object rotates. A characterization of a modulation error is obtained from the first set of signals. The modulation error is a periodic signal having a frequency greater than and proportional to a frequency of revolution of the load cell. A second set of signals is obtained from the load cell pursuant to object loading. A modulation error in the second set of signals is calculated as a function of the characterization of the modulation error from the first set. The calculated modulation error in the second set of signals is subtracted from the second set of signals.

31 Claims, 3 Drawing Sheets

MODULATION ERROR COMPENSATION FOR A ROTATING LOAD CELL

CROSS REFERENCE TO RELATED APPLICATION

The present application is based on and claims the benefit of U.S. provisional Pat. application Ser. No. 60/200,152, filed Apr. 26, 2000, the content of which is hereby incorporated by reference in its entirety.

BACKGROUND OF THE INVENTION

The present invention relates to a spinning or rotating load cell that measures and transmits linear forces along and moments about three orthogonal axes. More particularly, a system and method for compensating for modulation errors that occur on the output signals from the load cell.

One example of a rotating load cell is a wheel force transducer, which is useful in measuring the loads imparted on a vehicle through the tire and rim assembly. U.S. Pat. No. 5,969,268 discloses one type of wheel force transducer or load cell that has enjoyed considerable success. Generally, the load cell includes a rigid central hub and a rigid annular ring that is concentric with the hub. A plurality of radial tubes joins the central hub to the annular ring. In one embodiment, four radial tubes are used and are spaced at equal angular intervals about a central axis of the hub. Strain sensors are mounted to the tubes and sense strain therein. The strain sensors are connected together so as to provide output signals useful in measuring the forces or moments with respect to three orthogonal axes. However, it is well known to those skilled in the art that other forms of multiaxis transducer such as modular component transducer assemblies, piezoelectric sensing element assemblies, or any other multi-axis load sensing device can provide similar data.

The load cell is particularly well suited for measuring the force and moment components of a rolling wheel. The load cell replaces a center portion of a tire rim, wherein the annular ring is attached to or formed integral with the tire rim, while the central hub is secured to a vehicle spindle. The load cell measures the forces and/or moments as the tire is spinning. As appreciated by those skilled in the art, the loading on each of the plurality of tubes of the transducer is sinusoid in nature because the load cell is spinning. The spinning loads recorded by the load cell can be converted to "non-spinning" vehicle coordinates based on the geometric relationship of the angular position of the wheel and tire assembly.

In most wheel force transducers or other rotating load cells, the signals from the sensing elements related to a rotating coordinate system will have a modulation error. Since outputs corresponding to a "non-spinning" coordinate system are based on outputs related to the spinning coordinate system, the outputs corresponding to a non-spinning coordinate system will also have a modulation error. Typically, this error will occur as "N" times per revolution. For example, a load cell of the type described above can exhibit a vertical load (representing the weight of the vehicle) of 1,000 lbs. when driven on a straight and smooth surface. However, due to the modulation error, this load can vary +/−40 lbs. with a frequency four times the rotation of the load cell.

As appreciated by those skilled in the art, modulation error is undesirable, as it introduces error into the acquired data. This error not only makes the data inaccurate by this amount, but it can also be significantly detrimental in durability and fatigue testing because of its cyclical nature. Commonly, the output signals from the load cells are used to generate command files for simulation machines that simulate loading in the laboratory. When modulation errors exist in the command files for durability or other testing, the modulation error introduces a cyclical load command that does not really exist in the original test data.

There thus is an ongoing need to ensure accurate data acquisition in order to measure and predict actual force and moment loading on a spinning load cell.

SUMMARY OF THE INVENTION

A process for removing a modulation sinusoidal error from signals of a rotating load cell measuring forces and/or moments with respect to a non-rotating orthogonal coordinate system includes mounting the load cell to the rotating object and obtaining a first set of signals from the load cell, wherein at least one signal of the first set of signals is indicative of a load as the object rotates. A characterization of a modulation error is obtained from the first set of signals. The modulation error is a periodic signal having a frequency greater than a frequency of revolution of the load cell. A second set of signals is obtained from the load cell pursuant to object loading. A modulation error in the second set of signals is calculated as a function of the characterization of the modulation error from the first set. The calculated modulation error in the second set of signals is subtracted from the second set of signals.

Compensation can be provided during loading of the object through analog and/or digital electronics. Likewise, compensation can be provided by computation routines (software routines) during data acquisition, or post-processing of the data. Modules (analog/digital/software) can implement the foregoing process and provide compensation. This process is particularly well suited for removing a majority of the modulation error that exists in a wheel force transducer system that measures spindle loads on a vehicle.

DETAILED DESCRIPTION OF THE ILLUSTRATIVE EMBODIMENTS

Figure 1:
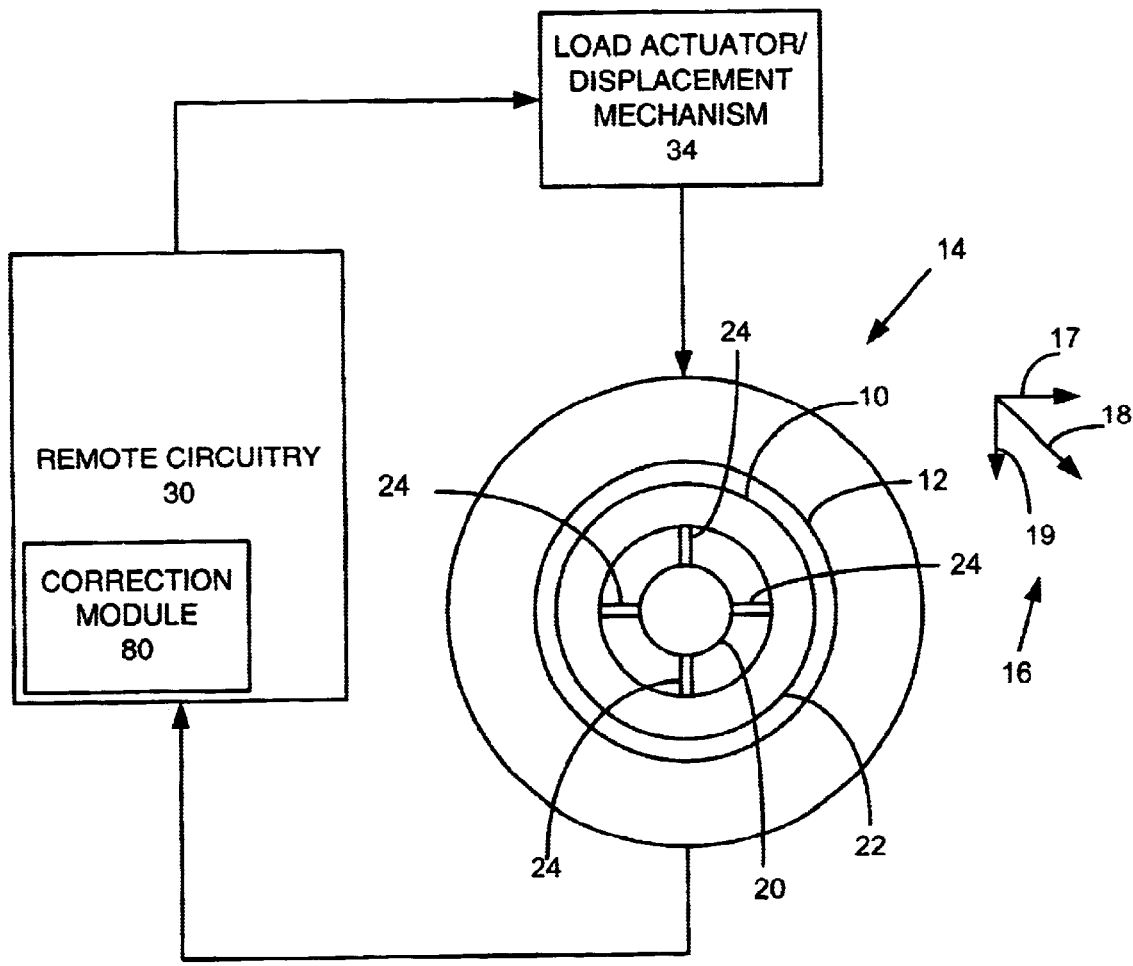
FIG. 1 is a block diagram illustrating first and second operating environments of the present invention.

Before describing details of the present invention, a discussion of suitable operating environments may be helpful. FIG. 1 illustrates two operating environments that include a wheel force transducer or load cell 10 coupled to and rotating with a wheel rim 12 of a tire and wheel assembly 14. While rotating with the tire and wheel assembly 14, the load cell 10 measures forces and/or moments with respect to an orthogonal coordinate system 16 comprising mutually perpendicular axes including a x-axis 17, a y-axis 18 and a z-axis 19.

The load cell 10 can take many known forms. U.S. Pat. No 5,969,268, which is hereby incorporated by reference in its entirety, discloses one exemplary type of load cell. Generally, this form of a load cell 10 includes a rigid central hub 20 and a rigid annular ring 22 that is concentric with the hub 20. A plurality of radial tubes 24 joins the central hub 20 to the annular ring 22. In the embodiment schematically illustrated, four radial tubes 24 are used and are spaced at equal angular intervals about a rotational axis of the hub 20. Typically, the orthogonal coordinate system 16 is oriented such that the y-axis 18 corresponds to the rotational axis, but is herein shown separated therefrom only for illustrative purposes.

Sensors mounted on the tubes 24 sense strain therein. The sensors are connected together so as to provide output signals useful in measuring the forces or moments with respect to the coordinate system 16. The load cell 10 typically includes an angular measuring device, not shown, such as an encoder to measure the position of the load cell 10 as it rotates in order to properly associate measurements by the sensing devices and thereby calculate the corresponding forces and moments with respect to the orthogonal coordinate system 16. Although the load cell 10 herein illustrated includes radially oriented sensing structures, it should be noted that other load cell constructions including but not limited to axially oriented sensing structures, or other multi-axis load cell designs can benefit from the present invention.

The load cell 10 provides corresponding signals indicative of the measured forces and moments to a remote circuitry 30. In a first operating environment comprising data acquisition, the remote circuitry 30 includes a data recorder that will record signals from the load cell 10 (analog or digital). Thus, actual loading can be measured and used for analysis and testing purposes. In another embodiment, an actuator and/or displacement mechanism 34 can be operably coupled to the tire and wheel assembly 14. The actuator and/or displacement mechanism 34 receives signals from the remote circuitry 30. Typically, in this operating environment, the load cell 10 can function in a feedback path or loop in order to apply selected or desired loading upon the tire wheel and wheel assembly 14.

Figure 2:
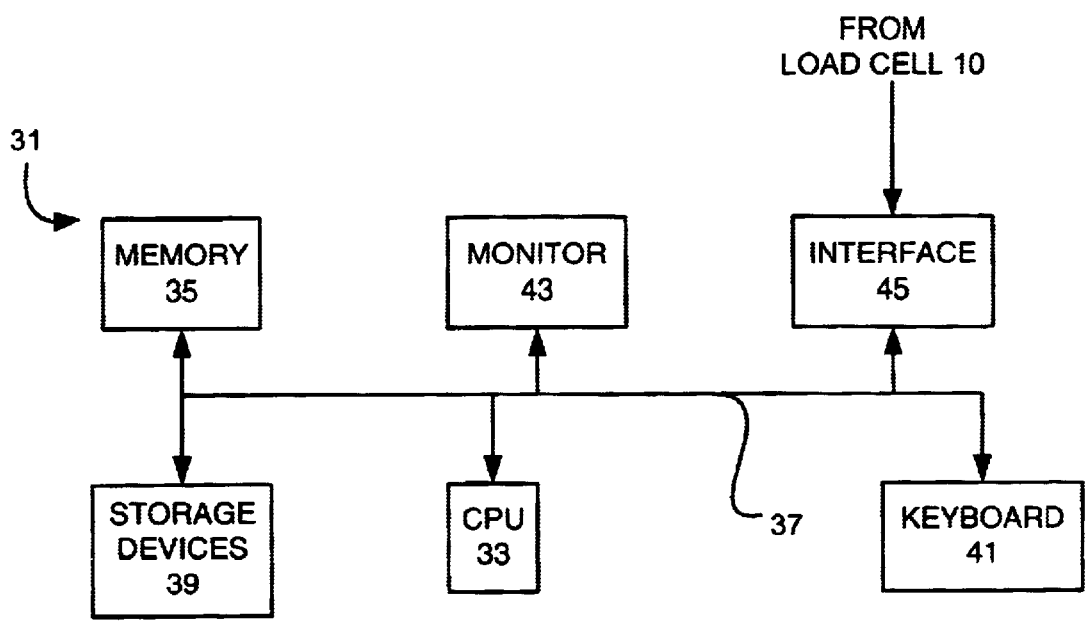
FIG. 2 is a block diagram of computer.

FIG. 2 and the related discussion provide a brief, general description of a suitable computing environment in which the invention may be implemented. Although not required, the remote circuitry 30 will be described, at least in part, in the general context of computer-executable instructions, such as program modules, being executed by a computer 31. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions. Moreover, those skilled in the art will appreciate that the invention may be practiced with other computer system configurations, including multi-processor systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 31 illustrated in FIG. 2 comprises a conventional personal or desktop computer having a central processing unit (CPU) 33, memory 35 and a system bus 37, which couples various system components, including the memory 35 to the CPU 33. The system bus 37 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 31, such as during start-up, is stored in ROM. Storage devices 39, such as a hard disk, a floppy disk drive, an optical disk drive, etc., are coupled to the system bus 37 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 35 from at least one of the storage devices 39 with or without accompanying data.

An input device 41 such as a keyboard, pointing device (mouse), or the like, allows the user to provide commands to the computer 31. A monitor 43 or other type of output device is further connected to the system bus 37 via a suitable interface and provides feedback to the user. The signals from the load cell 10 can be provided as an input to the computer 31 through an interface 45, including a digital-to-analog converter, or through the removable media of the storage devices 39, or a communication interface (modem, serial connection, etc) as recorded digital data. Commonly, compensated signals are provided as an output in the form of digital data.

It should be noted that use of the load cell 10 on the tire or wheel assembly 14, wherein modulation error compensation is also provided, is particularly useful. However, the process or method of modulation error compensation as well as a module (hardware or software) for performing the method modulation error compensation can also be used with other rotating or spinning objects such as but not limited to helicopter blade spindles, rotating drums on test machines, spinning half axle or universal joint test stands, etc.

It has been discovered that modulation error is predictable, and thereby possible to compensate for in the force and moment indicative signals received from the load cell 10. With reference to the orthogonal coordinate system 16, the modulation error is a periodic signal (force or moment) along or about the x-axis 17 and the z axis 19, or some vector therein on a radially oriented axis in the x-z plane. This vector of the radially oriented axis is a function of the equivalent radial load. The modulation error is a periodic signal commonly sinusoidal in nature. In particular, the force and moment signals will include a modulation error, or sinusoidal error, as a given vector is loaded against the spinning or rotating load cell 10. Commonly, the modulation error will have a frequency "N" times per revolution of the load cell 10. For instance, one common form of modulation error is at a frequency that is four times per revolution of the rotation of the wheel. In this common "4N" frequency modulation error, the magnitude of the modulation error is generally dependent on the magnitude of loads (forces or moments) transmitted through the load cell 10 as well as a function of the components forming the measuring system such as the load cell 10 and objects connected thereto (wheel rims, etc.). Generally, it has been found that the magnitude of the modulation error increases in a primarily linear relationship with increasing loads carried by the load cell 10.

Figure 3:
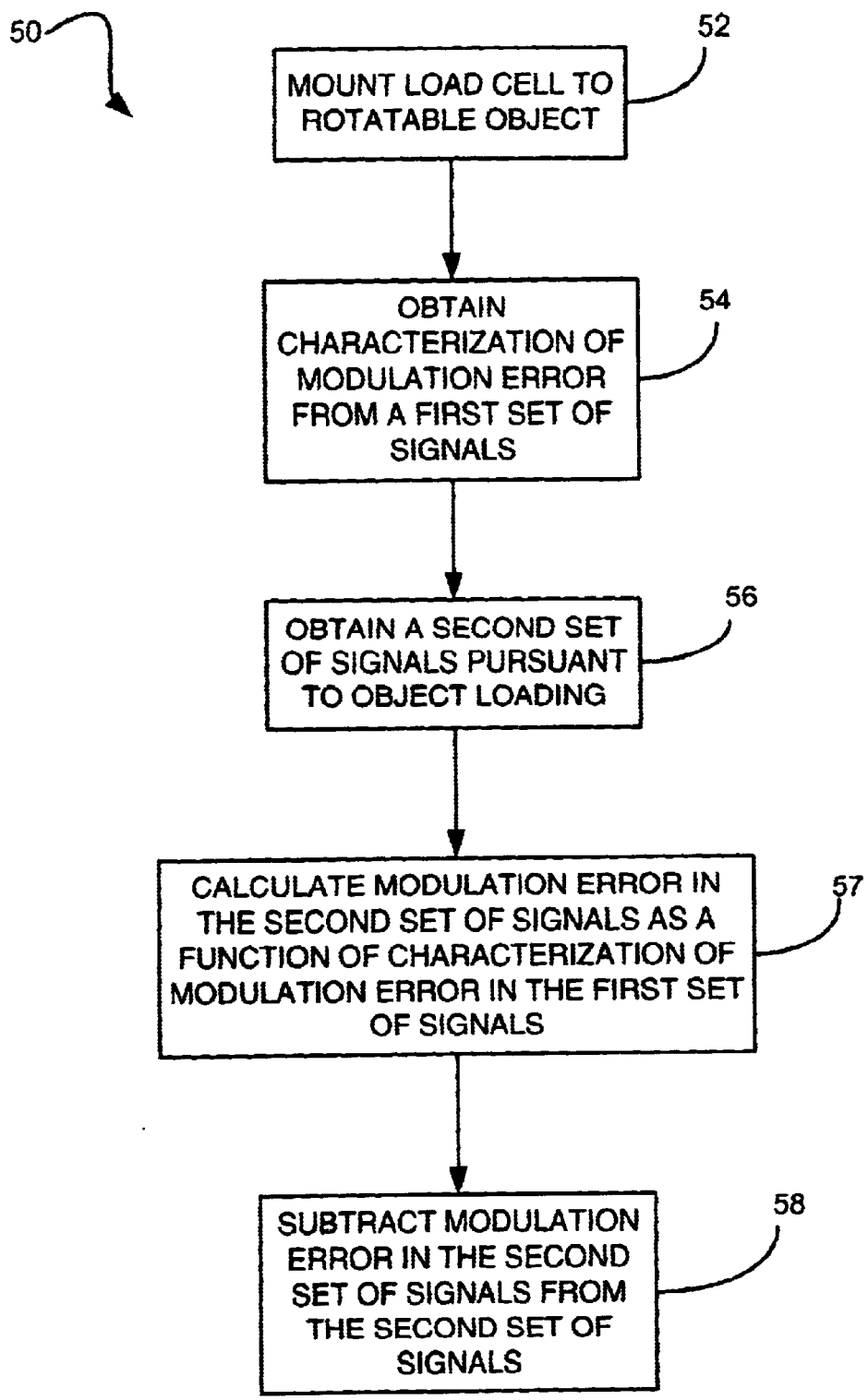
FIG. 3 is a method or process for removing modulation error from signals obtained from a rotating load cell.

FIG. 3 illustrates a process or method 50 for removing a modulation sinusoidal error from signals of a rotating load cell measuring forces and/or moments with respect to a non-rotating orthogonal coordinate system. The method 50 includes mounting the load cell 10 to a rotating object such as the tire and wheel assembly 14 herein illustrated and obtaining a first set of signals from the load cell 10 wherein at least one signal of the first set of signals is indicative of a non-spinning coordinate load as the transducer rotates, as illustrated at step 52. At step 54, a characterization of the modulation error in the first set of signals is calculated (using analog, digital or software modules). The modulation error has a periodic signal having a frequency greater than and typically proportional to a frequency of revolution of the load cell. (Note that the frequency is dependent on the rotational speed of the load cell). At step 56, a second set of signals from the load cell 10 is obtained pursuant to object loading. A modulation error in the second set of signals is calculated (using analog, digital or software modules) as a function of the characterization of the modulation error from the first set at step 57. At step 58, the modulation error obtained in step 57 is subtracted from the second set of signals in order to provide modulation error compensation.

When embodied as a wheel force transducer or load cell, which is particularly useful in measuring loads on a vehicle, step 52 includes mounting the load cell 10 to a vehicle spindle. In step 54, at least one signal of the first set of signals is indicative of at least one of the vehicle weight or applied moment as the vehicle travels along a smooth road surface and the load cell rotates. In particular, if modulation error compensation is to be provided for linear forces with respect to orthogonal coordinate system 16, the vehicle should be driven slowly over a smooth road surface in order that the vehicle weight is represented as a force along the z-axis 19 (which will also include modulation error) and modulation error is also present along the x-axis 17, at a phase which is one quarter revolution out of phase from the z axis 19. Likewise, if modulation error compensation is to be provided for moments about the x-axis 17 and the z-axis 19, the vehicle can be driven slowly over a smooth road surface in a constant radius turn in order to apply an overturning moment.

Calculating the characterization parameters of the modulation error in step 54 can be completed using any one of a number of known techniques. For instance, statistical techniques including the use of a curve fitting software routine running on computer 31 can analyze data indicative of the measured signals. Other statistical techniques include RMS evaluation. Commonly, an angular offset of the modulation error relative to an angle of rotation of the load cell 10 and a value indicative of a magnitude error in the modulation error is calculated and typically comprises the characterization parameters. These values along with the signals corresponding to the second set are used to obtain the modulation error of the second set of signals at step 57. During compensation, step 58 includes using the modulation error obtained for the second set of signals.

Again, using a wheel force transducer or load cell by way of example modulation compensation can be provided for forces or moments along or about the x-axis 17 and the z-axis 19. (Note in order to provide a general description for either force or moment compensation, "L" as used below can be a force along an axis or a moment about the axis, while "load" as used below would then be a force or a moment, respectively.) Relevant signals or channels from the load cell 10 include a signal from the angular positioning sensor of the load cell 10, a signal corresponding to a load with respect to the x-axis 17 $L_x$ and a signal corresponding to a load with respect to the z-axis 19 $L_z$. Commonly, each of these signals have been digitized for recording and processing. However, differences in conditioning prior to digitization can result in the angle and load signals being unsynchronized. Accordingly, synchronization of the signals within a data set may be required. Likewise, if preconditioning filters introduce distortion at an angle reset transient common with digital encoding devices, such filtering will need to be disabled for the angle signal only. Resynchronization of the angle channel will probably be necessary in such situation. It should also be noted that the data or signals can be filtered to remove "uncharacteristic" data or signal values that may have resulted from small disturbance or noise spikes.

Using statistical techniques (e.g. curve fittings, RMS evaluation or other processing techniques), the offset angle (phi) of the modulation error relative to the angular position of the load cell, and the magnitude (K) as a ratio of error amplitude to mean level is calculated from the first data set and comprises the characterization parameters. As an alternative to use of statistical routines, signals or values corresponding to $L_x$ or $L_z$ can be analyzed to determine the offset angle (phi) and the error amplitude of the modulation error. In particular, analysis can include identifying successive peaks of the load signals $L_x$ or $L_z$. A maximum value for each of the peaks and the relative offset of each of the peaks is recorded. The amplitude values can then be averaged to obtain the amplitude error. Likewise, the relative offsets can be averaged in order to calculate the offset angle (phi). K can then be calculated from the amplitude error. Although either the data or signals corresponding to $F_z$ or $F_x$ can be used, the signal or values corresponding to $F_x$ may be easier in view that there is no substantial loading along the x-axis 17 in contrast to the weight of the vehicle present in the signal $F_z$.

In this embodiment, the mean level of the radial load of the first data set, e.g. the weight of the vehicle or the force along the z-axis 19 when modulation force compensation is provided for forces, is required in order to calculate the characterization parameter K. This value can be determined through the use of scales or directly from the $F_z$ signal obtained from the load cell 10.

Compensation for the second data set is accomplished by first computing the component of the second data set which is the modulation error content of the second data set. The calculation of the modulation error content of the second data set requires that the same vehicle set up including transducer, rim, and vehicle attachment including the angular reference of the encoder, is held constant between the first data set and the second data set. The characterized modulation parameters K and "phi" are determined from the first set of signals (data set), and assumed to hold true for the second set of signals (data set).

Calculation of the modulation error content of the second data set is based on computing the modulation error which is specific to the loading of the second data set, based on the characterization of the first data set. The specific loading of the second data set is output in the signals from the transducer in the second data set.

The Radial Resultant Load for a given data point, or instance in time, is calculated from the $L_x$ and $L_z$ signals of the second data set. This Radial Resultant Load indicates the mean level of the radial load applied to the transducer, which the amplitude of the modulation error is known to be approximately linearly proportional to. The Radial Resultant Load is a calculated value based on signals at a given instance. The calculation of the Radial Resultant Load at each instance is preferred and will represent a computed data set (signals) of varying magnitude with varying loading of the transducer.

The vector of the Radial Resultant Load in the second data set is defined as angle "psi" and is also required for the calculation of the modulation error component of the second data set. The apparent angle between the angle reference "phi" and the actual sinusoidal angle reference of the actual modulation error will vary with varying vector of the Radial Resultant Load, and is represented by the angle "psi". The angle "psi" will be a computed angle, and will have varying values at different instances with varying loading conditions.

Compensation for the second set of signals in step 58 can be provided according to the following equations, where all values correspond to the unique outputs or calculated outputs of the second data set: (As noted above, L as used in these equations can be a force along an axis or a moment about the axis. Likewise, "Load" as used in these equations would then be a force or a moment, respectively.)

$$L_z \text{ corrected} = L_z \text{ uncorrected} - L_z \text{ modulation error}$$

$$L_x \text{ corrected} = L_x \text{ uncorrected} - L_x \text{ modulation error}$$

Where the Radial Modulation Error for the second data set can be provided according to the following equations, $$L_x \text{ Modulation Error Component} = (K*\text{Radial Resultant Load})*\sin(N*(\text{angle of revolution}-phi-psi))$$

$$L_z \text{ Modulation Error Component} = (K*\text{Radial Resultant Load})*\sin(N*(\text{angle of revolution}-phi-psi))$$

Where the Radial Resultant Load and psi are calculated for each instance from the second data set, and phi and K are characteristic parameters for the transducer configuration as determined from the first data set.

$$\text{Radial Resultant Load} = sqrt(L_x^2 + L_z) \text{ for each instance from the second data set}$$

$$Psi = A\tan(-L_x/L_z) \text{ for each instance from the second data set.}$$

K=Modulation error amplitude/Radial Resultant Load as characterized from the first data set N=Modulation error frequency/Load cell rotational frequency An alternative method for the modulation compensation includes removal of the modulation error while in the varying vector as defined by psi of the equivalent radial load, and then using the angular position of the vector and resolving the corrected equivalent radial load back into the x-axis 17 and z-axis 19.

The equivalent radial load magnitude and vector are determined using the following equations for each instance in the second data set:

$$Psi = A\tan(-L_x/L_z) \text{ for each instance from the second data set}$$

$$\text{Equivalent Radial Load} = sqrt(L_x^2 + L_z^2) \text{ for each instance from the second data set}$$

The magnitude of the modulation on this Equivalent Radial Load can then be calculated using the characterized modulation parameter K which was derived from the first data set:

Modulation Magnitude=K*Equivalent Radial Load for each instance of the second data set The angular position of the modulation will be a function of the actual rotation of the transducer relative to the angle reference, as well as the offset value "phi" as determined in for this configuration from the first data set, and the varying angle "psi" which represents the vector of the equivalent radial load for each instance in the second data set:

Component of Modulation Error in Vector Tangent to Equivalent Radial Load Vector=Modulation Magnitude*(cos($N$*(angle of rotation$-phi-psi$))) for each instance of the second data set Component of Modulation Error in Equivalent Radial Load Vector=Modulation Magnitude*(sin($N$*(angle of rotation$-phi-psi$))) for each instance of the second data set The correction to the equivalent radial load can then be performed by subtracting the error component:

Corrected Equivalent Radial Load=Equivalent Radial Load−Component of Modulation Error in Equivalent Radial Load Vector Once the Corrected Equivalent Radial Load is calculated, the output can be resolved back into the $L_x$ axis 17 and the $L_z$ axis 19 using the angle psi $L_x$ Corrected=Sin($-psi$)_*Corrected Equivalent Radial Load $L_z$ Corrected=Cos($-psi$)*Corrected Equivalent Radial Load Those skilled in the art of compensation will realize that the error component of the signals must be used as input into the correction. It is possible that an iterative approach based on the same compensation philosophy could be employed to use corrected inputs in the calculation of the magnitude where the Equivalent Radial Load Value is used, so as to iteratively remove the error where possible.

Referring back to FIG. 1, the remote circuitry 30 can include a correction module 80 embodied as analog and/or digital electronics, or software routines executable on computer 31 to implement step 58 wherein the characterization of the modulation error is stored as component values or in memory and the calculations indicated above are performed. Likewise, the remote circuitry 30 or computer 31 can include modules or routines to implement step 54 to characterize the modulation error. It should be noted that compensation can be provided through analog circuitry or digital processing of the signals during data acquisition, or through post-processing of data obtained from the load cell 10.

Although the present invention has been described with reference to preferred embodiments, workers skilled in the art will recognize that changes may be made in form and detail without departing from the spirit and scope of the invention.

What is claimed is:

1. A process for removing a modulation sinusoidal error from signals indicative of a rotating wheel load cell measuring forces and/or moments with respect to a non-rotating orthogonal coordinate system, the process including:

mounting a wheel load cell to a vehicle spindle;

obtaining a first set of signals from the wheel load cell, wherein at least one signal of the first set is indicative of at least one of vehicle weight and applied moment as the vehicle travels along a smooth road surface and the load cell rotates;

calculating a characterization of a modulation error from the first set of signals, the modulation error being a periodic signal having a frequency greater than a frequency of revolution of the load cell;

obtaining a second set of signals from the wheel load cell pursuant to vehicle loading;

calculating a modulation error in the second set of signals as a function of the characterization of the modulation error in the first set of signals; and subtracting the modulation error in the second set of signals from the second set of signals.

2. The process of claim 1 wherein obtaining a characterization includes calculating an angular offset of the modulation error relative to an angle of rotation of the load cell and a value indicative of a magnitude error in the modulation error.

3. The process of claim 2 wherein the value comprises a ratio of error amplitude to mean level.

4. The process of claim 2 wherein obtaining a characterization includes analyzing the first set of signals with a curve fitting routine.

5. The process of claim 1 and further comprising:
filtering the set of signals to remove transient noise.

6. The process of claim 1 wherein the first set of signals and the second set of signals comprise analog signals.

7. The process of claim 1 wherein the first set of signals and the second set of signals comprise digital data.

8. A digital correction process for removing a modulation error from data indicative of a loads measured by a rotating load cell, the load cell measuring forces and/or moments with respect to a non-rotating orthogonal coordinate system, the digital filtering process comprising:

analyzing data corresponding to a first set of signals from the load cell to obtain a characterization of modulation error, wherein the modulation error is a periodic signal having a frequency greater than a frequency of revolution of the load cell; and subtracting a modulation error from data indicative of a second set of signals indicative of loads measured by the load cell to remove the modulation error, the modulation error of the second set of signals being a function of the characterization of the modulation error of the first set of signals.

9. The digital correction process of claim 8 wherein at least one signal of the first set is indicative of at least one known linear force and moment with respect to the orthogonal coordinate system as the load cell rotates, and the modulation error is a function of said at least one known linear force and moment.

10. The digital correction process of claim 9 wherein obtaining a characterization includes calculating an angular offset of the modulation error relative to an angle of rotation of the load cell and a value indicative of a magnitude error in the modulation error, and wherein subtracting includes using the offset and the value indicative of the magnitude error.

11. The digital correction process of claim 10 wherein the value comprises a ratio of error amplitude to mean level.

12. The digital correction process of claim 10 wherein obtaining a characterization includes analyzing the data corresponding to the first set of signals with a curve fitting routine.

13. The digital correction process of claim 9 and further comprising:
filtering the set of signals to remove transient noise.

14. The digital correction process of claim 8 wherein the modulation error comprises an angular offset relative to an angle of rotation of the load cell.

15. The digital correction process of claim 14 wherein the modulation error comprises a constant amplitude.

16. A process for removing a modulation sinusoidal error from signals indicative of a rotating load cell measuring forces and/or moments with respect to a non-rotating orthogonal coordinate system, the process including:

mounting a load cell to a rotating object;

obtaining a first set of signals from the load cell, wherein at least one signal of the first set is indicative of a load as the object rotates;

calculating a characterization of a modulation error from the first set of signals, the modulation error being a periodic signal having a frequency greater than and a frequency of revolution of the load cell;

obtaining a second set of signals from the load cell pursuant to object loading;

calculating a modulation error in the second set of signals as a function of the characterization of the modulation error in the first set of signals; and subtracting the modulation error in the second set of signals from the second set of signals.

17. The process of claim 16 wherein obtaining a characterization includes calculating an angular offset of the modulation error relative to an angle of rotation of the load cell and a value indicative of a magnitude error in the modulation error, and wherein subtracting includes using the offset and the value indicative of the magnitude error.

18. The process of claim 17 wherein the value comprises a ratio of error amplitude to mean level.

19. The process of claim 17 wherein obtaining a characterization includes analyzing the first set of signals with a curve fitting routine.

20. The process of claim 16 and further comprising:
filtering the set of signals to remove transient noise.

21. The process of claim 16 wherein the first set of signals and the second set of signals comprise analog signals.

22. The process of claim 16 wherein the first set of signals and the second set of signals comprise digital data.

23. The process of claim 16 wherein the modulation error comprises an angular offset relative to an angle of rotation of the load cell.

24. The process of claim 16 wherein the modulation error comprises a constant amplitude.

25. In combination with a load cell, a correction module for removing a modulation error from data indicative of a loads measured by the load cell when rotated, the load cell measuring forces and/or moments with respect to a non-rotating orthogonal coordinate system, the correction module capable of receiving a first set of signals from the load cell and obtaining therefrom a characterization of modulation error, wherein the modulation error is a periodic signal having a frequency greater than and proportional to a frequency of revolution of the load cell, the module further obtaining a modulation error in a second set of signals as a function of the characterization of the modulation error in the first set of signals; and subtracting the modulation error in the second set of signals from data indicative of the second set of signals to remove the modulation error.

26. The combination of claim 25 wherein at least one signal of the first set is indicative of at least one known linear force and moment with respect to the orthogonal coordinate system as the load cell rotates, and the modulation error is a function of said at least one known linear force and moment.

27. The combination of claim 26 wherein the correction module calculates an angular offset of the modulation error relative to an angle of rotation of the load cell and a value indicative of a magnitude error in the modulation error, and wherein subtracting includes using the offset and the value indicative of the magnitude error.

28. The combination of claim 27 wherein the value comprises a ratio of error amplitude to mean level.

29. The combination of claim 25 wherein the module includes a curve fitting routine to obtain the characterization of the modulation error.

30. The combination of claim 25 wherein the modulation error comprises an angular offset relative to an angle of rotation of the load cell.

31. The combination of claim 30 wherein the modulation error comprises a constant amplitude.

\* \* \* \* \*